June 24, 1924.

G. V. JOHNSTON

FLYING SHEARS

Filed Oct. 14, 1921

1,498,550

6 Sheets-Sheet 1

Inventor
Gustave V. Johnston

June 24, 1924.
G. V. JOHNSTON
FLYING SHEARS
Filed Oct. 14, 1921
1,498,550
6 Sheets-Sheet 2

Inventor.
Gustave V. Johnston
By
Rector Hibben Davis & Macauley
Attorneys.

June 24, 1924.
G. V. JOHNSTON
1,498,550
FLYING SHEARS
Filed Oct. 14, 1921    6 Sheets-Sheet 3
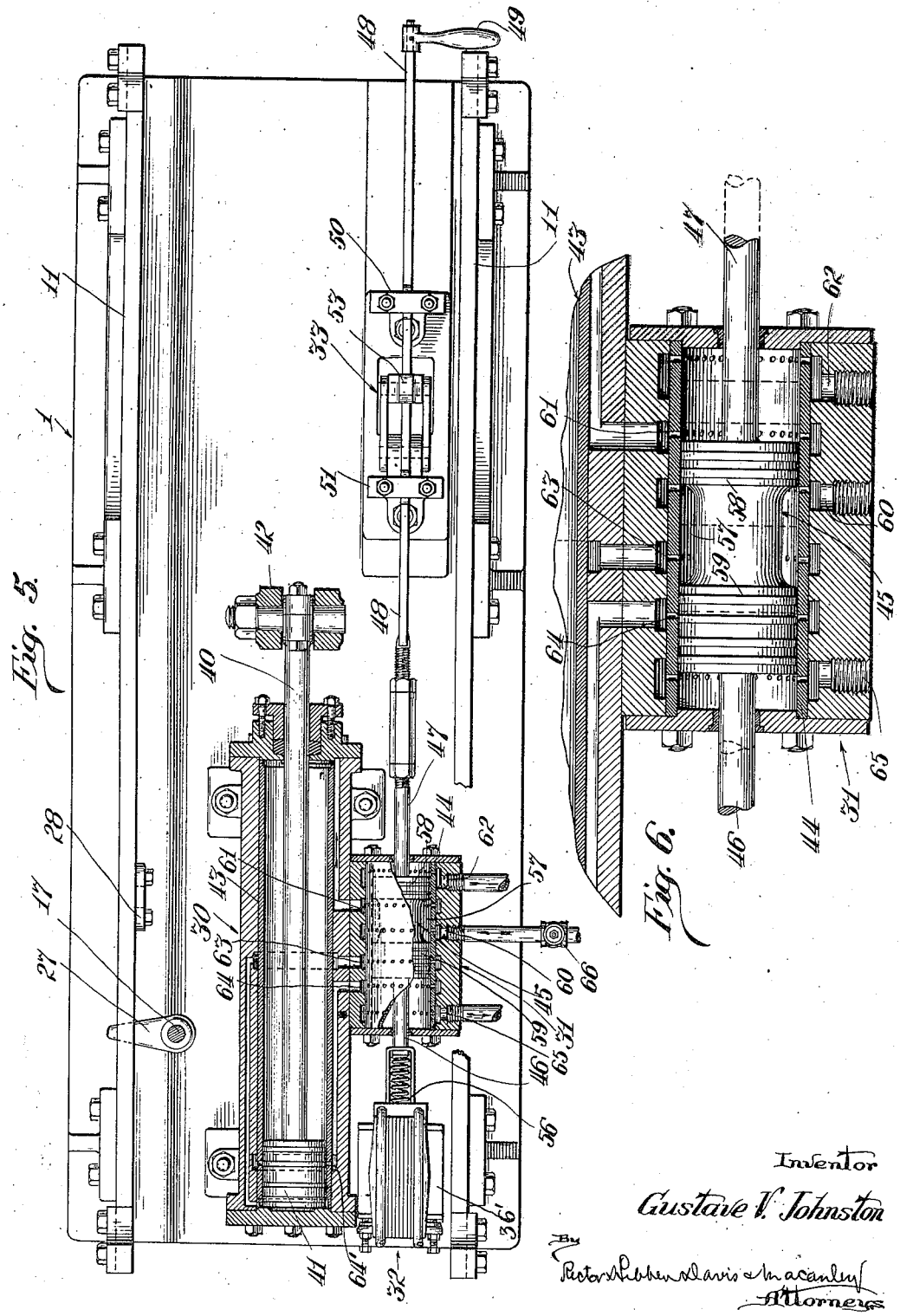
Inventor
Gustave V. Johnston
By Victor ?ibben Davis & Macauley
Attorneys

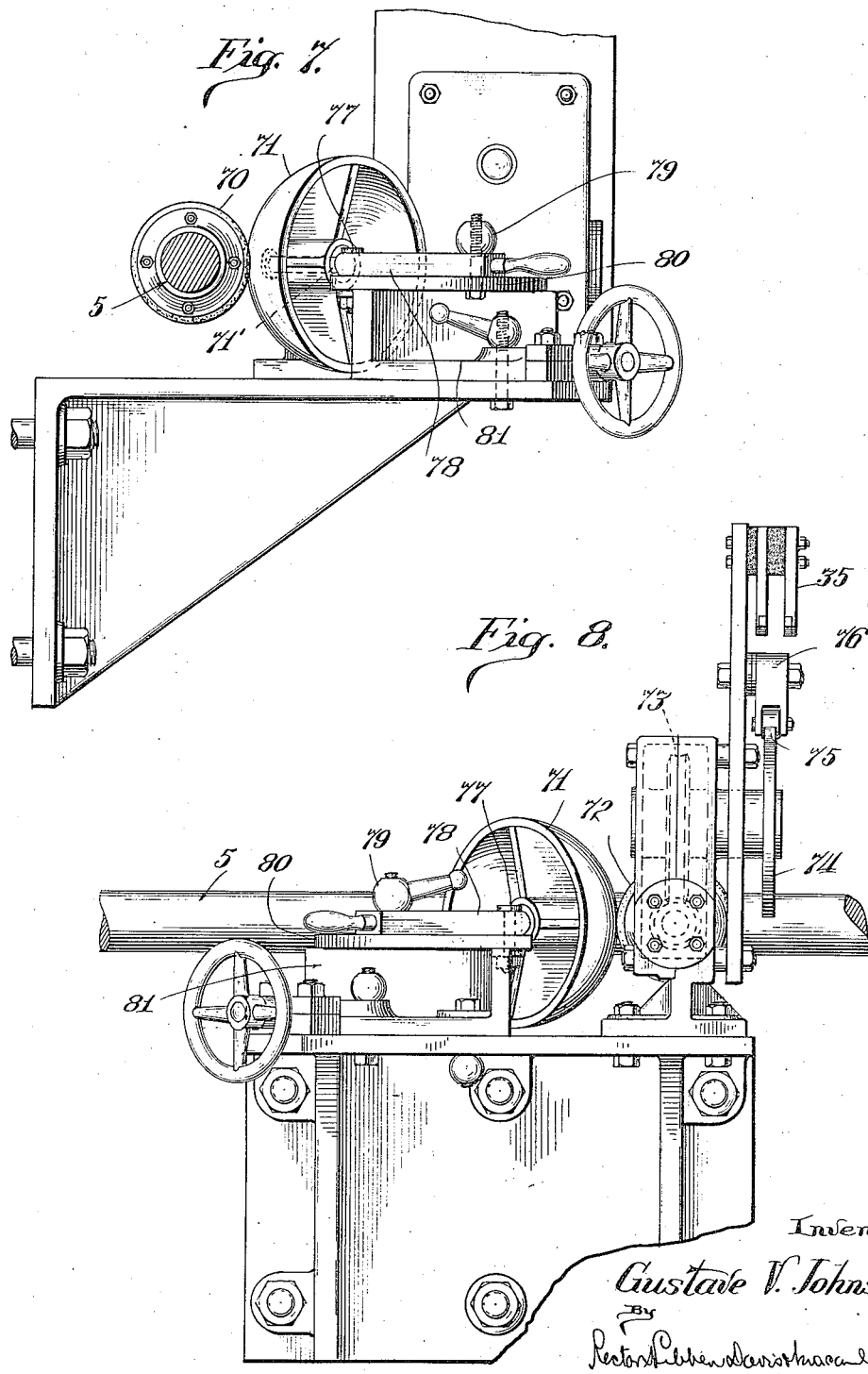

June 24, 1924.

G. V. JOHNSTON

FLYING SHEARS

Filed Oct. 14, 1921

1,498,550

6 Sheets-Sheet 5

Inventor
Gustave V. Johnston
By
Attorneys.

June 24, 1924.

G. V. JOHNSTON

FLYING SHEARS

Filed Oct. 14, 1921

1,498,550

6 Sheets-Sheet 6

Inventor
Gustave V. Johnston
By Pettor Shibben Davis + Macauley
Attorneys.

Patented June 24, 1924.

1,498,550

UNITED STATES PATENT OFFICE.

GUSTAVE V. JOHNSTON, OF CHICAGO, ILLINOIS, ASSIGNOR, BY MESNE ASSIGNMENTS, TO THE ELYRIA IRON AND STEEL COMPANY, A CORPORATION OF OHIO.

FLYING SHEARS.

Application filed October 14, 1921. Serial No. 507,623.

*To all whom it may concern:*

Be it known that I, GUSTAVE V. JOHNSTON, a citizen of the United States, residing at Chicago, in the county of Cook and State of Illinois, have invented certain new and useful Improvements in Flying Shears, of which the following is a specification.

My invention is particularly adapted for cutting continuously-moving tubing into measured lengths without stopping or retarding the progress of the tubing. Among the objects of my invention are to provide such a flying shear or cutting off mechanism that will operate effectively when the stock is moving at very high speed; the provision in such shear mechanism of means to synchronize the speed of travel of the shear with that of the tubing with assurance that the tubing will not be stopped or retarded; the provision of advantageous means for accelerating and stopping the traversing movement of the shear-carriage; and the provisions of improvements in general organization and in structural detail touching the stated character of mechanism. For the attainment of these and other objects, which will become apparent to those skilled in the art from the following description taken in conjunction with the accompanying drawings, my invention consists in the features of construction, combinations and arrangements of parts hereinafter set forth and claimed.

Figure 1:
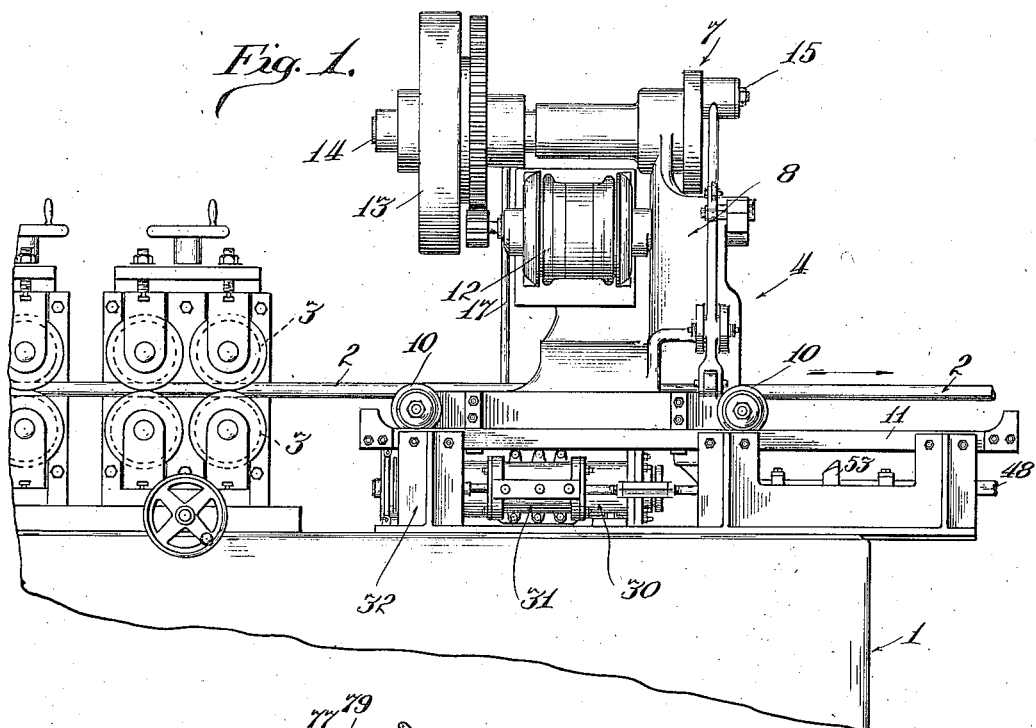
Figure 2:
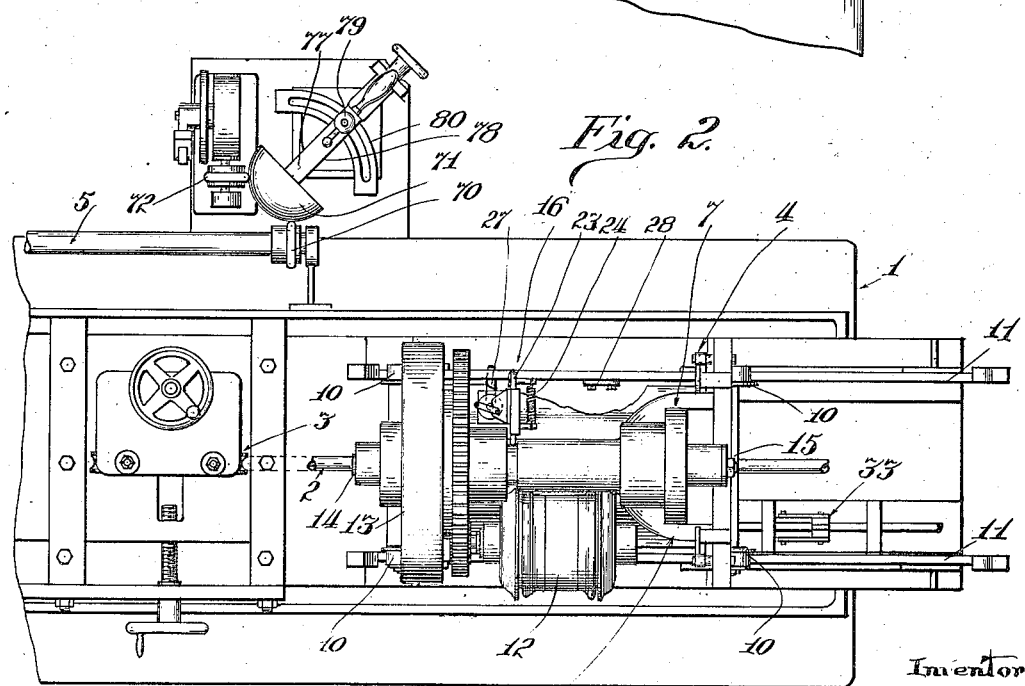
Figures 4, 5:
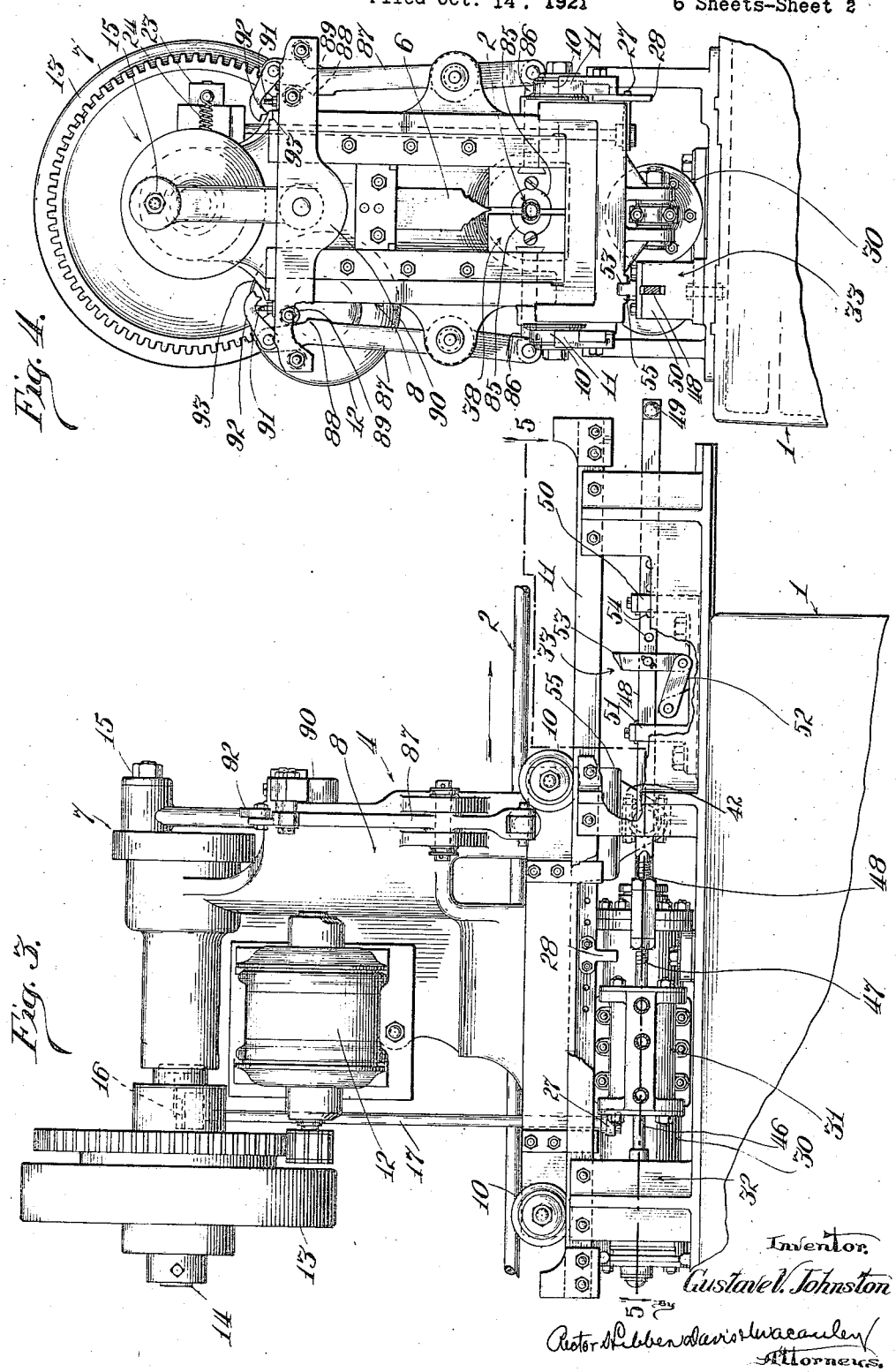
Figure 10:
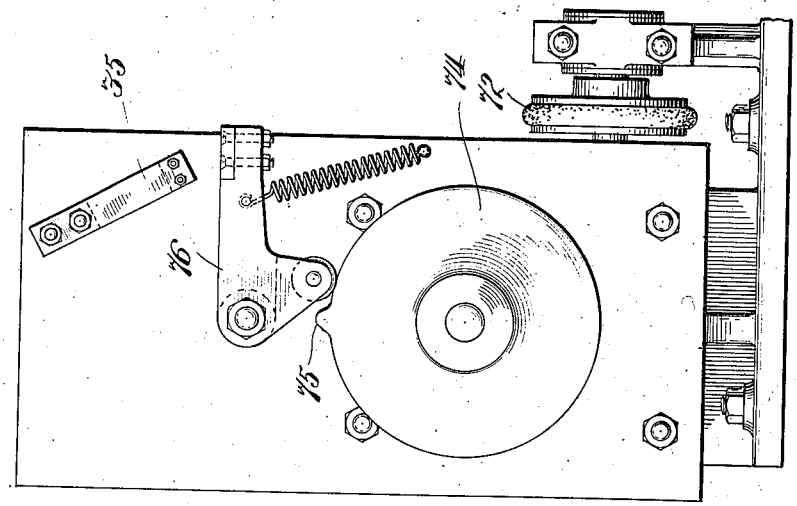
Figure 9:
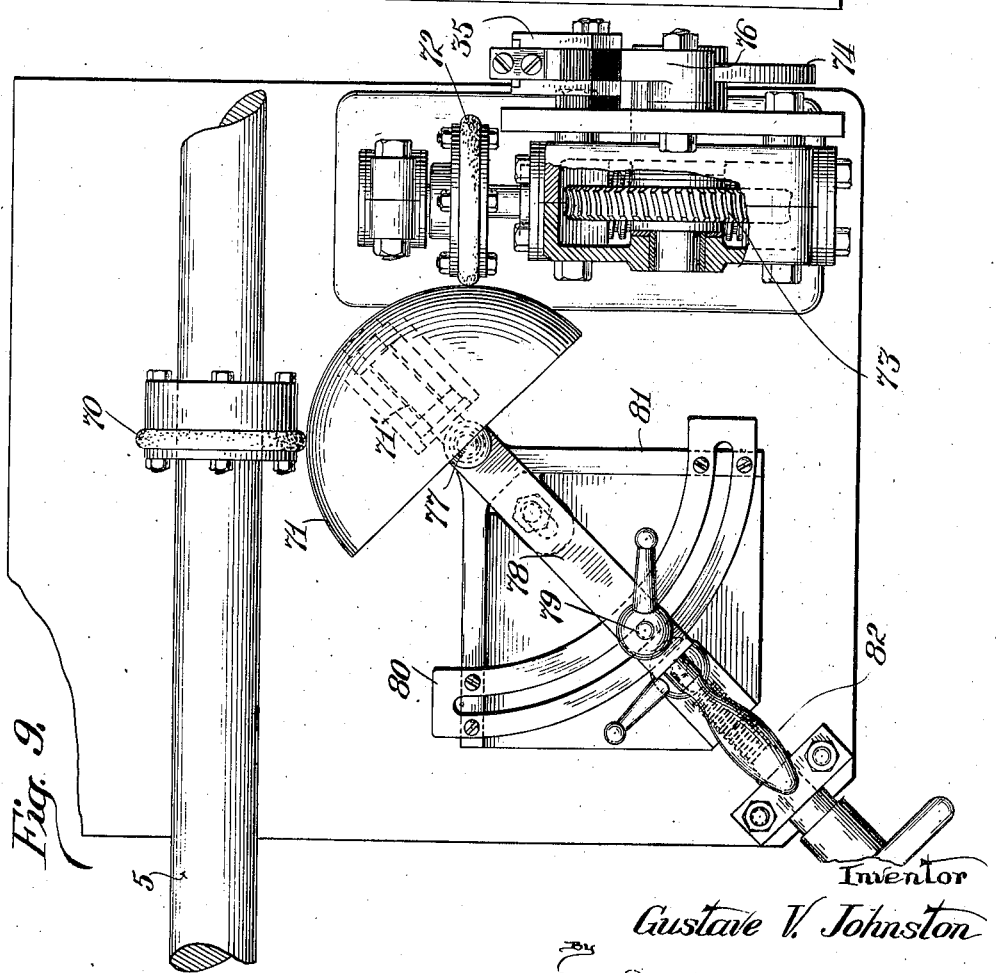
Figure 11:
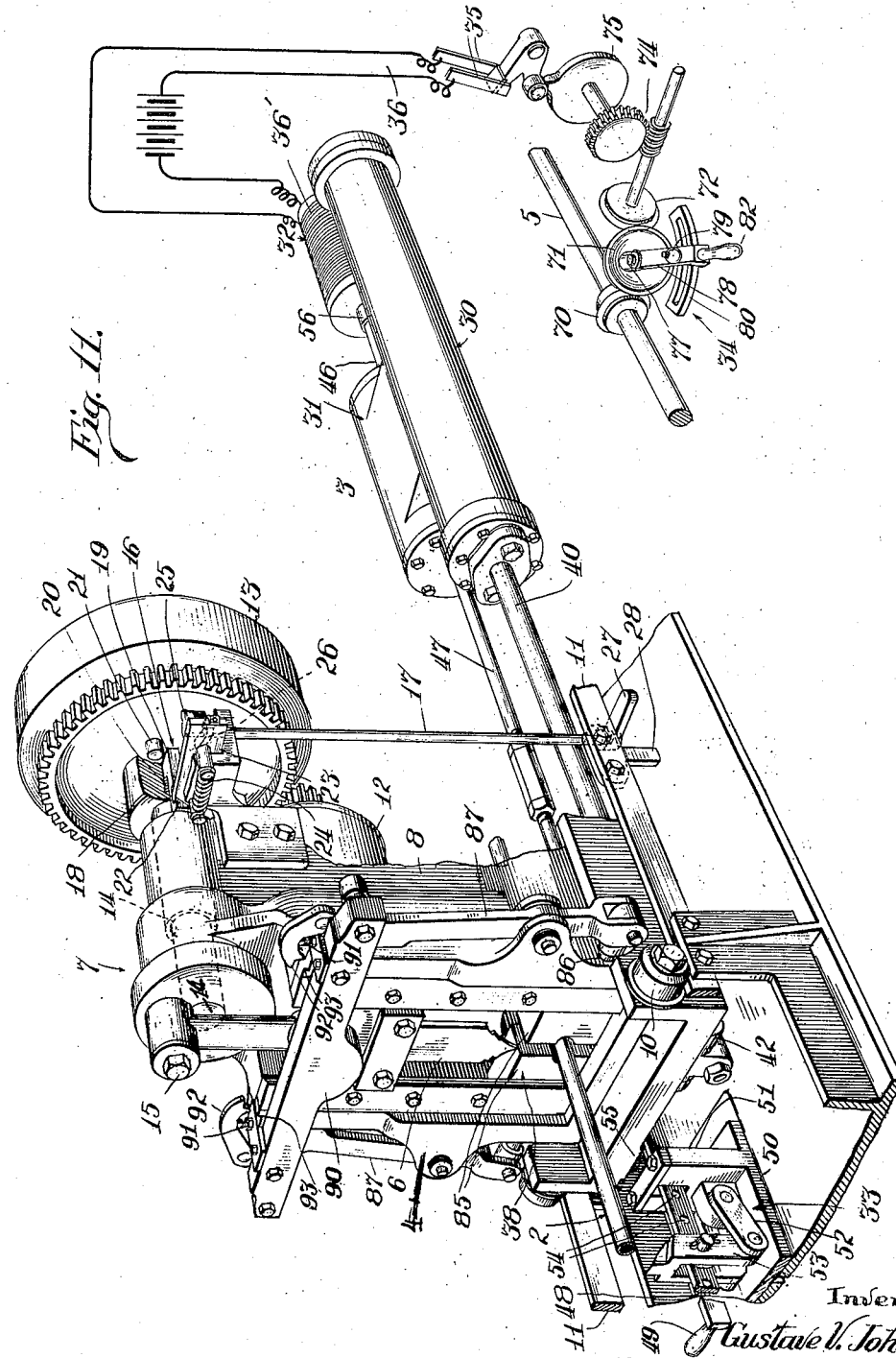

In the drawings, Fig. 1 is a side elevation of a portion of the delivery end of a tube-machine equipped with a flying shear mechanism embodying my invention; Fig. 2 is a plan view of the apparatus shown in Fig. 1; Fig. 3 is a side elevation of the punch-press; Fig. 4 is an end elevation of the punch-press; Fig. 5 is a horizontal section on line 5—5 of Figs. 3 and 4 showing the actuating cylinder and its valve; Fig. 6 is a detail of the valve shown in Fig. 5; Fig. 7 is an elevation of a timer as viewed from the right of Fig. 2; Fig. 8 is another elevation of the timer as viewed from the back of the machine (top of Fig. 2); Fig. 9 is a plan view of the timer; Fig. 10 shows a switch mechanism of the timer; Fig. 11 is a diagrammatic view showing the control system.

Referring to the drawings, 1 represents the bed plate at the delivery end of a machine through which the tubing 2 is being passed from suitable rolls 3 into the field of operation of the flying-shear mechanism 4. The tube-supplying machine thus fragmentarily shown may be of any character that will propel, in continuous fashion or cut, and more specifically it may be a high speed tube-welding machine propelling the tubing, as continuously made, through the rolls 3 as straightening rolls, the rate of tube-propulsion being, say about ninety feet per minute. I have found the shear mechanism hereinafter described to work very satisfactorily at such high speeds, also at slower speeds, and kindred mechanism is probably operable in connection with tubing traveling at even higher rate than that named. Of the tube-forming machine in general it suffices to say that 5 indicates a power shaft having connections (not shown) with the tube-propelling mechanism in such suitable fashion that, from number of rotations of shaft 5 the length of tubing expelled from the tube-machine is accurately determinable.

The knife or blade 6 for tube-severance, pointed in known fashion desirable for this specific class of work, is vertically reciprocable across the line of travel of the tube by punch-press mechanism 7 that generically is of known character and is mounted in a frame or carriage 8 that straddles the tube and is traversable back and forth along a line paralleling the line of travel of the tube. Wheels 10 of the carriage run on rails 11 suitably mounted on bed 1, and provision is made such that when the punch press is actuated to strike the blade 6 downwardly to sever the tube 2, the carriage 8 is traveling forward at the same speed as the tube.

Generally to outline the mechanisms, hereinafter described more in detail, the punch press mechanism is preferably driven by a source of power carried on its frame, electric motor 12, so mounted, constantly gear-driving the fly wheel 13 that normally runs loose on crank shaft 14 whose crank 15 operates the blade 6, said fly wheel being connectable with the crank shaft through a striker mechanism 16 (generically of well-known character) which, whenever vertical rock shaft 17 is rocked in appropriate direction, clutches the constantly running fly wheel to the crank shaft for a single rotation only, causing a single reciprocation of the vertical blade 6. In the striker mechanism specifically shown the two-dimension sleeve 18 fixed to the normally motionless shaft 14 carries the axially slidable clutch block 19 acted on by spring 20 to project its rear end from normally retracted position into the path of striker pins 21 of the fly wheel, such clutch block being normally held retracted by engagement of its beveled notch-face 22 with a laterally extending slide piece 23 that is in-pressed by a spring 24 but may be slid outwardly along its guide on the frame by the action of a finger 25 of rock shaft 17 against a spring-pressed knuckle-pawl 26. Properly turning rock shaft 17 throws back the slide 23 until finger 25 escapes from pawl 26; meanwhile clutch block 19 is spring-pressed into the path of strikers pin 21 (of which any suitable number may be provided) and shaft 14 is turned, but as it completes its revolution slide 23, spring-retracted to normal position after its escape from finger 25, intercepts the cam face or incline of the clutch block withdrawing said clutch block from engagement with the fly wheel and stopping shaft 14.

Since, in automatic operation of the machine, carriage 8 should be traveling substantially at tube-speed when the rapid knife-stroke is made, it is generally desirable to trip the striker mechanism as a result of travel of the carriage and at a point where the carriage is somewhere near the middle of its limited range of reciprocation. To this end a lever 27 on the lower end of rock shaft 17 is arranged to strike a stop 28 suitably mounted for longitudinal adjustment on the rail 11, at a proper selected point in the forward travel of the carriage, thereby to rock the shaft 17. By manual operation of the accessible lever 27 the punch press may be caused to act at any arbitrarily selected time, as in testing the mechanism.

For traversing the punch press carriage 1 employ an engine 30 of suitable character mounted on the bed plate, this engine being preferably one operatable by compressed air as a preferred fluid and governed by a valve mechanism 31, the operations of which may be automatically controlled and also may be manually controlled. As diagrammatically illustrated in Fig. 11, I preferably employ an electro-responsive device 32 for imparting to the movable element of valve 31 such motion as will supply fluid to the engine to cause the forward travel of the punch press carriage, because such an electro-responsive device is easily controllable through simple electrical connections, but the movement of the shiftable part of the valve in opposite direction to cause return travel of the punch press carriage I preferably effect mechanically through operating connections worked by the traveling carriage itself, such carriage-operated valve-restoring mechanism being generally indicated at 33. While the control of the electro-magnetic device 32 may be variously effected, I preferably work from the power shaft 5 as a suitable part rotating in known proportions of the linear travel of the tubing, causing such shaft through a suitable timer 34 to operate an electric switch 35 in the suitably energized circuit 36 for the electro-responsive device. Thus, after a given number of revolutions of shaft 5 (determinable by adjustment of the timer 34) the closure of switch 35 will energize magnet 36' to operate the valve mechanism 31 so as to admit fluid behind the piston of engine 30, driving the carriage 8 forward at a speed that, at its maximum, substantially equals the rate of progress of the tube 2, such travel of the carriage causing the striker mechanism to be released through the co-action of parts 27 and 28 and the consequent down-stroke of knife 6 to occur while the carriage is in full-speed travel, and later causing the return of valve mechanism 31 to normal position through the action of carriage 8 on the mechanical connections 33, such return of the valve of course causing the reversal of fluid connections with the engine that will stop the travel of the carriage and occasion its return to normal position. Furthermore, to insure rigorous synchronism of carriage travel and tube-travel at the instant that the blade 6 acts to sever the tube, I preferably provide tube-clamping means 38 carried by the punch-press frame and automatically operatable firmly to engage the tube during the time or period of tube-severance, so that if the engine-impelled travel of the carriage be at a rate slightly different from the rate of tube travel, the momentary connection of the carriage with the tube will insure rigorous synchronism at the critical period of the actual tube-cutting operation.

In the specific construction shown engine 30, mounted on the frame directly below the line of tube travel has the rod 40 for its piston 41 connected to lug 42 of the carriage, and, beside the cylinder 43 of the engine the cylinder 44 of valve 31 is mounted, its piston 45 being of the D-type and its piston rod having a rearwardly extending portion 46 for cooperation with the electro-responsive device 32 and the forwardly extending portion 47 united with a squared rod or extension 48 to which the manual control handle 49 is connected and on which the carriage-controlled valve returning devices 33 operate. A guide 50 sustains the extension 48 and on the bed 1 is mounted a longitudinally adjustable guide and bearing member 51 to which is pivoted a link 52 connected to lower end of lever 53 pivoted in any selected one of a series of holes 54 in rod 48 so that after the carriage 8 has moved forward a distance determined by the adjustment of this controlling mechanism 33 a striker part 55 of the carriage may act on the beveled end of lever 53 pressing it forward and with it moving the valve rod 48—47. The electro-responsive device for moving the valve in its rearward or travel-initiating direction may be any suitable form of solenoid magnet, the core 56 of which may be directly connected with the valve rod 46. When the valve stands in the normal position shown in Fig. 5 its piston chamber 57 between the shorter forward end 58 and the longer rearward end 59 opens communication between air supply passage 60 and the ports 61 that communicate with the extreme forward end of the engine cylinder 43. In this position the short head 58 of the valve is interposed between the ports 61 and the exhaust passage 62 from the valve while the longer head 58 overlies and closes engine inlet port 63 communicating with the extreme left-hand end of the engine cylinder that leaves the engine exhaust port 64,—and which has a communicating opening 64' to the cylinder at a little distance from the end of the cylinder,—standing in open communication through the unobstructed left end of the valve cylinder with the second eduction port 65. In this normal position air supplied under suitable pressure through the valve inlet 60 under control of a regulating valve 66 is acting on the front side of engine piston 41 to cause it to hold the punch press carriage in normal rearmost position, and piston 41 having passed the engine outlet port 64' holds a small body of air under compression in the end of the engine cylinder, enlarged head 59 of the valve piston preventing its escape by closing the port 63. When the valve piston is shifted to the other end of its throw, as shown in Fig. 6, inlet duct 60 is opened to the left end of the engine cylinder through port 63, eduction port 64 from that end of the cylinder is closed, and port 61 for the forward end of the cylinder is opened beyond the piston cylinder head 58 to the eduction passage 62. Consequently the engine piston will be impelled in a forward direction. While the specific construction of engine and valve above described may be departed from in detail, the many advantages of this particular construction in matters of cushioning what otherwise might be shocks of stopping the carriage travel, and of ensuring prompt starting and quick, non-jarring acceleration of the punch press carriage will be apparent upon reflection.

While, of course, the operation of the manual handle 49 for the valve rod will enable the punch press carriage to be started and stopped arbitrarily at the pleasure of the operator, its wholly automatic operation requires energization of the electro-magnet at intervals determined by the amount of tubing ejected from the tube machine, in order that length-cutting may be uniform. Arrangement might be made whereby the contact 35 controlling the solenoid circuit would be closeable by the projected tube 2, but I find it to be satisfactory, and therefore prefer, to operate the contact by a readily adjustable timer mechanism 34 actuated from a machine shaft 5 as heretofore generally described. As shown in Fig. 9 friction wheel 70 on shaft 5 bears against a spherical transfer head 71 against which there also bears the friction wheel 72 that, through worm-gearing 73 communicates motion to a cam 74 the projection 75 whereof operates the spring retracted knife switch lever 76 for contact 35. The spherical transfer head 71 is preferably a full hemisphere, rotating on a shaft 71' lying in the axis of the parti-spherical surface, this shaft being pivoted as at 77 and having a lever extension 78 that may be clamped as at 79 to an arc-plate 80. This, or any other suitable form of variable speed reduction gear will serve to operate switch 76 to close the solenoid circuit periodically at intervals equal to a given number of rotations of the shaft 5 and therefore corresponding with a given linear progression of the tube 2. To ensure adequate contact between the head 71 and the friction wheels the frame plate 81 on which the head mechanism is mounted is slidably adjustable at a 45 degree angle to the shaft 5, the pressure being variable by means of the hand-wheel-actuated screw 82. Of course the arc 80 may be graduated to read in terms of feet of tubing per cut.

In equipping the punch press mechanism 7 with automatic means 38 for making gripping engagement with the tube 2 I provide opposed semi-circular clamp dies 85, normally separated and through which the tube 2 passes, these carried by rods 86 horizontally slidable in the frame 8 and respectively operated by pivoted levers 87 of the first class, the upper ends of which have cam surfaces 88 coacting with rollers 89 that are carried by a cross-head 90 vertically reciprocable with the knife 6. As the knife is in course of descent, these rollers cam over the levers 87 clamping the jaws 85 upon the tube with a sufficient friction grip to slightly accelerate or retard, as need be, the travel of the carriage without injuring the tube. As the cross-head 90 descends its vertical pins 91 move out of contact with latch pawls 92 pivoted on the extremities of the lever arms 87 and these pawls drop into engagement with shoulders 93 of the frame, holding the jaws closed pending the return of the cross-head 90 and blade 6 to raised position, when the pins 91 lift the pawls 92 out of the stated shoulder-engagement.

The operation of the machine above described is as follows:

Assuming the tube machine to be propelling the tubing at a definite and constant rate, the air pressure for the pneumatic engine is regulated so that at about mid-stroke the piston will be driving the punch-press carriage in the direction of tube travel at substantially the speed of tube travel, the timer mechanism 34 is suitably adjusted accordingly to the length of tubing desired to be cut, the striker stop 28 for the punch press striker mechanism is adjusted to proper position and suitable adjustment of the return-stroke lever 53 on the extension of the engine valve stem is made. Normally, now, the valve piston stands in the forward position shown in Fig. 4 and the compressed air is supplied to the front side of the engine piston 41 to hold the punch press carriage at the rear end of its travel. The constantly rotating shaft 5 of the tube machine, that is acting to propel the tubing through the shear mechanism, also acts through the friction gear train 70, 71, 72 and the worm gearing 73 slowly to rotate the switch closing cam 74 that actuates the spring-retracted knife switch blade 76. When this blade closes the contact 35, solenoid 32 is energized and acts through the valve rod to pull the valve piston 45 to the rear end of its cylinder, whereupon the compressed air or other actuating fluid for the engine is admitted behind the left end of piston 41, forcing piston 41 and with it the punch press carriage in the direction of movement of the tube. As the punch press travels forward, and has attained substantially the speed of the moving tube the lever 27 on rock shaft 17 engages the properly adjusted stop 28 tripping the striker mechanism 16 of the punch press which causes engagement between the motor driven, constantly running fly wheel and the normally motionless shaft 14 of said press, such connection, in usual fashion, enduring only for a single rotation of the connected parts and then being automatically severed by said striker mechanism. This rotation of the punch press crank shaft gives a single rapid reciprocation to the knife 6, it being my preference to effect this cutting action with the crank shaft making its rotation at the rate of about 300 R. P. M. As the knife is descending its cross-head 90 acts to cam in the gripper jaws 85 that firmly engage the tube for the brief period until said cross-head returns to normal position, thus ensuring that during the period of actual tube-severance the carriage and the tubing are moving at exactly the same speed. Of course the fact that the carriage is driven by an engine utilizing a compressible fluid enables this brief physical connection to be established without materially influencing one way or the other the speed of tube travel. As the punch press continues its forward movement after having severed the tube and having disengaged itself from the tube, the frame-portion 55 of the carriage strikes the lever 53, and drives forward the valve rod extension 48 so shifting the controlling valve back to its initial position in which it admits air to the forward end of the engine cylinder 43 and opens the exhaust port 64 at the rear end of the said cylinder. Of course the setting of the return-stroke lever is always such that the piston does not reach the extreme right end of its cylinder, but stops its forward progress and begins its rearward travel in air-cushioned fashion. When said piston 41, on its return stroke passes the exhaust port 64' it compresses the residual body of air between it and the cylinder end, so that the carriage is brought to rest in normal position under an air-cushioned action, and the compressed air in rear of piston 41 is retained under pressure to assist in initiating the next forward movement of the piston 41.

While I have hereinbefore fully described and in some detail a specific embodiment of my invention which I have found to be practical and desirable, it will be evident to those skilled in the art that many modifications of structure and arrangements of parts may be made without departing from the spirit of my invention within the scope of the appended claims.

I claim:

1. Flying shear mechanism for severing traveling stock, comprising, in combination, a movable carriage, stock-severing mechanism thereon, an engine to reciprocate said carriage, automatic means to control the engine operation, means to actuate the severing mechanism operatable while the carriage is moving, and means for controlling said actuating means adjustably settable to select that point within the range of travel of the carriage at which said actuating mechanism shall operate.

2. Flying shear mechanism for severing traveling stock, comprising in combination, a movable carriage, an engine to reciprocate it, automatic means to control the engine operation including an electro-magnet to govern the initiation of forward movement of the carriage and mechanical means operated by travel of the carriage for initiating the return movement of said carriage, and means to actuate said severing mechanism.

3. Flying shear mechanism for severing traveling stock, comprising, in combination, a movable carriage, an engine to reciprocate it, automatic means to control the engine operation including an electro-magnet to govern the initiation of forward movement of the carriage and mechanical means operated by travel of the carriage for initiating the return movement of said carriage, means to actuate said stock-severing mechanism operable while the carriage is moving and means to control said actuating means adjustably settable to select that variable point in the range of travel of the carriage at which said actuating mechanism shall operate.

4. Flying shear mechanism for severing traveling stock, comprising, in combination, constantly-running stock-propelling means, a carriage reciprocable on the line of stock-progression, stock-severing mechanism on the carriage, means to actuate said severing mechanism, an engine for reciprocating said carriage, means governed by and timed in operation from the stock-propelling means controlling the engine to initiate the forward carriage-travel, and other means controlling the engine to initiate return travel of the carriage after operation of said stock-severing means.

5. Flying shear mechanism for severing traveling stock, comprising, in combination, constantly-running stock-propelling means, a carriage reciprocable on the line of stock-progression, stock-severing mechanism on said carriage, means to actuate said severing mechanism operable while the carriage is moving, adjustably settable means for selectively determining the point in the carriage movement at which said actuating means shall operate, an engine for reciprocating said carriage, means governed by and timed in operation from the stock-propelling means controlling the engine to initiate forward carriage-travel, and other means controlling the engine to initiate return carriage-travel.

6. Flying shear mechanism for severing traveling stock, comprising, in combination, constantly-running stock-propelling means, a carriage reciprocable on the line of stock-progression, stock-severing mechanism on said carriage, means to actuate said severing mechanism operable while the carriage is moving, an engine for reciprocating said carriage, means governed by and timed in operation from the stock-propelling means controlling the engine to initiate forward carriage-travel, and means operable by the carriage and selectively settable to vary the point in the carriage travel at which said operation occurs, for controlling the engine to initiate forward carriage travel.

7. Flying shear mechanism for severing stock, comprising, in combination, stock propelling means, a carriage reciprocable along the line of stock travel, automatic stock-severing mechanism on said carriage operatable at a variably-predeterminable period in the forward travel of the carriage, a fluid-pressure engine for reciprocating said carriage having a control valve, means variably settable and controlled from said stock-propelling means, for operating said valve after desired stock progression to advance the carriage, and means for operating said valve to return the carriage after operation of the stock severing means.

8. Flying shear mechanism for severing stock, comprising, in combination, stock propelling means, a carriage reciprocable along the line of stock travel, automatic stock-severing mechanism on said carriage operatable at a variably-predeterminable period in the forward travel of the carriage, a fluid-pressure engine for reciprocating said carriage having a control valve, electro-responsive means variably settable and controlled from said stock-propelling means, for operating said valve after desired stock progression to advance the carriage, and means for operating said valve to return the carriage after operation of the stock severing means.

9. Flying shear mechanism of the class described, comprising, in combination, means for propelling stock, a carriage, a single-stroke punch press thereon having a shearing tool, an engine for reciprocating the carriage along the line of stock-travel, means for tripping said punch press after the carriage is in motion, automatic means settable for operation after each predetermined projection of the stock for initiating engine-operation to propel the carriage forward, and automatic means for initiating engine operation to return the carriage after punch-press operation.

10. Flying shear mechanism of the class described, comprising, in combination, means for propelling stock, a carriage, a single stroke punch press thereon having a shearing tool, an engine for reciprocating the carriage along the line of stock-travel, means for tripping said punch press after the carriage is in motion, means operatable by the punch press for locking the carriage to the stock during the severing operation only, automatic means settable for operation after each predetermined projection of the stock for initiating engine-operation to propel the carriage forward, and automatic means for initiating engine operation to return the carriage after punch-press operation.

11. In a flying shear mechanism, the combination with stock propelling means, of a reciprocable carriage, carriage-moving means arranged to advance the carriage independently of the stock at approximately the rate of stock travel and to retract the carriage, stock-severing means on the carriage, stock-gripping means on the carriage arranged for actuation by the stock-severing means, automatic means to operate said stock-severing means while the carriage is in forward motion, and automatic means for timing and initiating the operations of said carriage-moving means.

12. In a flying shear, the combination of a reciprocable carriage, shear mechanism thereon, means to propel stock past the shear mechanism, a fluid pressure engine arranged to reciprocate the carriage and having a fluid control valve, said engine having its exhaust port at one end of the cylinder spaced from the cylinder-head to leave a cushioning compression-space and its inlet port at said end closer to the cylinder-head and said valve having ports respectively connected with such cylinder-ports, means for and automatically moving said valve in one direction after each passage of a predetermined length of tubing, means for automatically actuating the shear mechanism during the resultant forward travel of the carriage, and means for automatically actuating the valve in the other direction after each operation of the shear mechanism.

13. In a flying shear mechanism, the combination with tube-propelling means, of a carriage reciprocable along the line of tube travel, shear mechanism carried thereby, a reciprocating engine for moving the carriage having a valve, electro-responsive means for moving said valve to initiate propulsion of the carriage forwardly, carriage-controlled means for moving said valve oppositely, means for actuating the electro-responsive means after each passage of a variably predeterminable amount of tubing, and automatic means for actuating the shear mechanism while the carriage is in forward travel.

14. In a flying shear mechanism, the combination with tube-propelling means, of a carriage reciprocable along the line of tube travel, shear mechanism carried thereby, a reciprocating engine for moving the carriage, having suitable ports including at its rear end an inlet port adjacent the cylinder head and an exhaust port longitudinally spaced therefrom, and having a valve, said valve having a cylinder with suitable ports including two separated ports communicating with the stated two ports of the engine and a piston arranged constantly to maintain said two valve ports non-communicating, automatic means for controlling the operations of said valve, and automatic means for actuating the shear mechanism while the carriage is in forward travel.

15. In a flying shear, the combination with tube-propelling means, of a slidable carriage, an engine to reciprocate it, automatic means for initiating the engine operations to cause the carriage to be driven independently of the tubing, shear mechanism on the carriage, actuating means therefor, and means on the carriage, controlled by the shear mechanism, for gripping the tubing during the shearing operation.

16. In a flying shear, the combination with tube-propelling means, of a slidable carriage, an engine to reciprocate it, automatic means for initating the engine operations to cause the carriage to be driven independently of the tubing, shear mechanism on the carriage including a vertically reciprocable member, actuating means therefor, and means on the carriage, controlled by the vertically reciprocable member of the shear mechanism, for grippng the tubing during the shearing operation.

17. In a shear mechanism as described, a vertically reciprocable blade, means to move it, tube-grippers below the raised position of said blade, levers for actuating said tube-grippers, and coacting devices between the levers and blade-moving means to operate the levers during the effective portion of the blade-reciprocation.

18. In a shear mechanism as described, a vertically reciprocable blade, means to move it, tube-grippers below the raised position of said blade, levers for actuating said tube-grippers and cam devices between the levers and blade-moving means to operate the levers during the effective portion of the blade-reciprocation.

19. In a shear mechanism as described, a vertically reciprocable blade, means to move it, tube-grippers below the raised position of said blade, levers for actuating said tube grippers cam devices between the levers and blade-moving means to operate the levers during the effective portion of the blade-reciprocation, and latch means for said levers to hold them in active position after their cam-movement pending return of the blade-moving means to normal position.

20. In a flying shear mechanism, a traveling carriage, an engine to reciprocate it, a shear mechanism on the carriage including a constantly running part, a shear part, a normally open clutch for connecting them, and means to trip the clutch at a selectively determined point in the forward travel of the carriage comprising a clutch-latch and an adjustably positioned trip-device for said latch.

21. In a flying shear mechanism, a traveling carriage, an engine to reciprocate it, a shear mechanism on the carriage including a constantly running part, a shear part, a normally open clutch for connecting them, and means to trip the clutch during the forward travel of the carriage, said means being adjustable to vary the tripping-point.

22. In a flying shear mechanism, a traveling carriage, an engine to reciprocate it, a shear mechanism on the carriage including a constantly-running part, a shear part, a normally open clutch for connecting them, means to trip the clutch during the forward travel of the carriage, and additional means manually to trip said clutch.

GUSTAVE V. JOHNSTON.